H. Y. LAZEAR & J. L. SHARP,

Said LAZEAR, assignor by mesne assignments, to said SHARP.

Gas Heater.

No. 9,333. Reissued Aug. 3, 1880.

Fig: 1

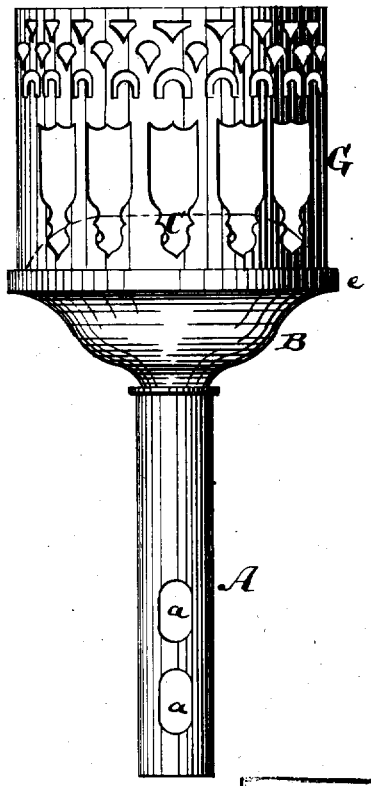

Fig: 2

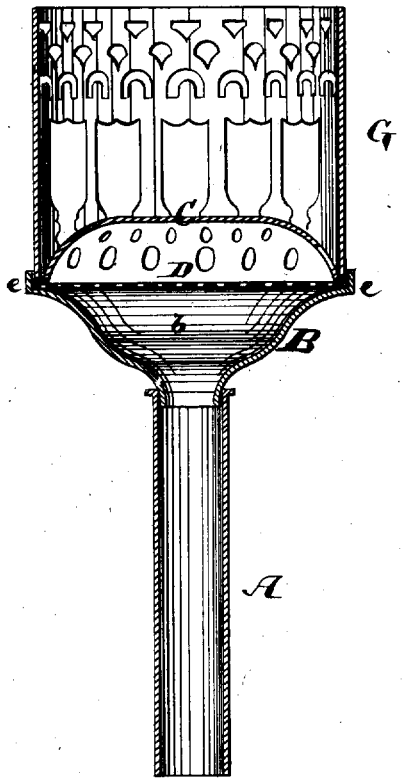

9,333. GAS-HEATER. HIRAM Y. LAZEAR, Chicago, Ill., and JAMES L. SHARP, New York, N. Y.; said Lazear assignor, by mesne assignments, to said Sharp. Filed June 7, 1880. Original No. 92,322, dated July 6, 1869.

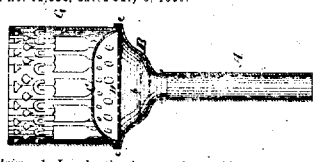

*Claim.*—1. In a heating-burner, the combination of the tube A with the flaring top ring, B, and with the perforated bulging top plate, C, covering said top ring, substantially as specified.

2. The combination of the tube A, flaring cap B, perforated diaphragm D, and bulging top plate, C, the diaphragm serving to mix the gas and air, and the plate C to produce the jets of flame, substantially as herein shown and described.

3. A gas-burner having a bulging perforated top plate supported above a perforated diaphragm, D, substantially as described.

*Witnesses*

John C. Tunbridge.

Willy G. B. Schultz.

*Inventors:*

Hiram Y. Lazear.

James L. Sharp by their attorney

A. V. Briesen

UNITED STATES PATENT OFFICE.

HIRAM Y. LAZEAR, OF CHICAGO, ILLINOIS, AND JAMES L. SHARP, OF NEW YORK, N. Y.; SAID LAZEAR ASSIGNOR, BY MESNE ASSIGNMENTS, TO SAID SHARP.

GAS-HEATER.

SPECIFICATION forming part of Reissued Letters Patent No. 9,333, dated August 3, 1880.

Original No. 92,322, dated July 6, 1869. Application for reissue filed June 7, 1880.

*To all whom it may concern:*

Be it known that we, HIRAM Y. LAZEAR, of Chicago, in the county of Cook and State of Illinois, and JAMES L. SHARP, of New York, in the county and State of New York, have invented a new and Improved Gas-Burner, of which the following is a specification.

Figure 1 is a side view, and Fig. 2 a vertical section, of our improved gas-burner.

This invention relates to a new burner for generating heat with the aid of illuminating-gas for the purpose of heating water, making coffee, tea, gruel, and the like, for nursery and various other purposes.

The leading object in its construction is to prevent smoke or "light-down," which object is obtained by having a free and full commingling of the gas and atmospheric air before the point of combustion is reached.

To this end the invention consists, first, in combining with the supply-tube a flaring annular base supporting a perforated bulging top plate.

It consists, secondly, in combining a perforated diaphragm or plate with the lower flaring ring and with the bulging top plate, all as hereinafter more fully described.

It consists, finally, in combining in such a burner the bulging top plate with a perforated diaphragm below the same.

In the accompanying drawings, the letter A represents the tube, which is adapted to receive the gas at its lower end, and which has holes or slots *a* for the admission of atmospheric air. Attached to the upper end or part of this tube A is a flaring ring, B, which forms the expansion-chamber. This expansion-chamber is covered by a bulging top plate or cap, C, that has holes in it, through which the mingled gas and air escape in lateral jets, and on which ignition takes place.

D is a perforated plate or diaphragm inserted between the cap C and the ring B, and held in contact with the edges of the bulging cap, as shown.

G is a perforated frame or screen, within which said burner above described is contained, and which serves to support the vessel to be heated.

It will be noticed that the perforated diaphragm D is some distance above the end of the tube A, and of greater diameter than said tube. This is far better than to have the perforated plate directly on the end of the tube, and of substantially the same diameter.

By this arrangement of the plates we are enabled to have the chamber *b* between the end of the tube and the horizontal diaphragm of proper lateral and vertical extent. In this chamber there will be a full and free commingling of the gas and atmospheric air, so that smoking will not occur, but the flame will be clear.

A flange, *e*, surrounds the ring B, and receives and partly embraces the bulging top plate, so that the ring B serves not only to support the top plate, but also to prevent it from being laterally displaced.

I claim—

1. In a heating-burner, the combination of the tube A with the flaring top ring, B, and with the perforated bulging top plate, C, covering said top ring, substantially as specified.

2. The combination of the tube A, flaring cap B, perforated diaphragm D, and bulging top plate C, the diaphragm serving to mix the gas and air and the plate C to produce the jets of flame, substantially as herein shown and described.

3. A gas-burner having a bulging perforated top plate supported above a perforated diaphragm, D, substantially as described.

HIRAM Y. LAZEAR.
JAS. L. SHARP.

Witnesses as to Hiram Y. Lazear:
JOHN A. THOMAS,
WILL. W. LAZEAR.
Witnesses as to James L. Sharp:
WILLY G. E. SCHULTZ,
WM. H. C. SMITH.